L. D. GREENLAND.
SWINGLETREE HOOK.
APPLICATION FILED SEPT. 5, 1913.
1,094,556.
Patented Apr. 28, 1914.
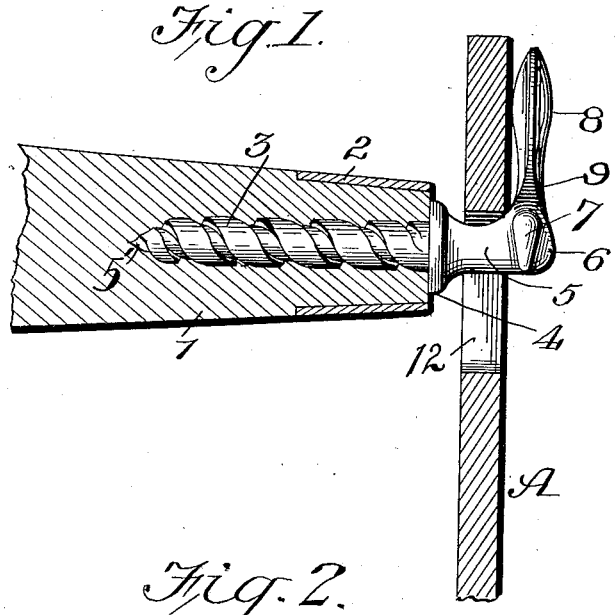
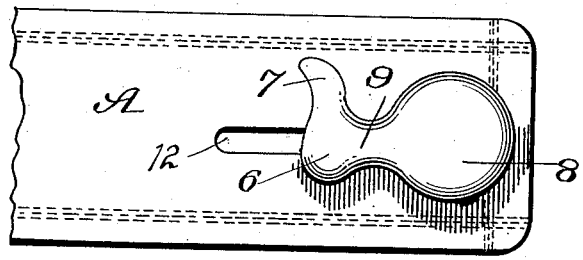
Witnesses
Jos. A. Ryan
May Barnes.
Inventor
Loyd D. Greenland
By George W. Lutz.
Attorney

UNITED STATES PATENT OFFICE.

LOYD D. GREENLAND, OF KNOXVILLE, IOWA, ASSIGNOR OF ONE-HALF TO A. VANDER WILT, D. VANDER WILT, AND W. G. VANDER PLOEG.

SWINGLETREE-HOOK.

1,094,556.     Specification of Letters Patent.     Patented Apr. 28, 1914.

Application filed September 5, 1913. Serial No. 788,310.

*To all whom it may concern:*

Be it known that I, LOYD D. GREENLAND, a citizen of the United States, and a resident of Knoxville, in the county of Marion and State of Iowa, have invented certain new and useful Improvements in Swingletree-Hooks, of which the following is a specification, reference being had to the accompanying drawings.

This invention relates to swingle tree hooks and one of the principal objects of the invention is to provide a swingle tree hook of a simple construction and composed entirely of one piece, which will not permit the trace to become accidentally detached therefrom when connected up to the hook in position for use.

Another object of the invention is to provide a swingle tree hook having an upstanding ear and an enlarged portion extending backward toward the vehicle, said ear and enlarged portion being of the desired size and shape to pass through the eye or hole in the trace, when the latter is turned at right angles to the line of draft and to be of such formation that the trace will not become accidentally detached therefrom.

These and other objects may be attained by means of the construction illustrated in the accompanying drawing, in which:

Figure 1, is a plan view of a swingle tree hook made in accordance with my invention and showing a portion of a trace and swingle tree in section; Fig. 2, is an end view of the hook.

Referring to the drawing, the numeral 1 designates a swingle tree which may be of the usual or any suitable construction and 2 is the ferrule surrounding the end of the swingle tree.

My swingle tree hook comprises a screw threaded shank 3 adapted to be inserted in a hole started in the end of the swingle tree and turned by means of the head of the hook until it is screwed into place. The shank 3 is provided with a gimlet point 5' so that it can be easily turned into place as shown in Fig. 1. An integral enlarged collar 4 is formed at the end of the threaded shank and this bears firmly against the end of the swingle tree. From the integral collar 4, extends a rounded neck 5, which neck ends in a slightly enlarged rounded head 6. Continued laterally from said head, that is substantially at right angles, is a second rounded neck 9, from which is continued a disk shaped button comprising a laterally extending circular portion 8 having bulging faces or outer sides. Extending from the head 6, in alinement with the button 8 is a forwardly curved upwardly extending pointed ear 7. This ear 7 extends at right angles to the neck 5, as clearly shown in Fig. 4.

In referring to Fig. 1 it will be seen that the eye or button hole 12 in the trace A must be turned at right angles to the line of draft in order to connect the trace to the swingle tree hook, for the reason that the eye 12 will not pass over the enlarged head 8, unless the eye is turned at right angles to the line of draft. When the eye 12 in the trace has been passed over the enlarged portion of the hook, it will readily slide over the head 6 and over the extended ear 7. In disconnecting the eye 12 from the hook, it is first moved outward until the projection 7 passes through the eye and then the trace is turned at right angles to remove the trace from the hook.

From the foregoing, it will be obvious that my trace hook can be manufactured at low cost, can be readily connected to any swingle tree, is formed entirely of one piece, and that the trace cannot be readily disconnected from the hook for the reason that in use, the trace will never assume a position at right angles to the line of draft and be drawn outward in order to disconnect it from the hook.

The button 8, is thicker than the width of the eye or slot 12 so that slight pressure is necessary to force the head through the slot.

Having thus described my said invention what I claim as new and desire to secure by United States Letters Patent is:

A swingle tree hook comprising a screw threaded shank ending in an enlarged collar from which extends a neck, said neck ending in a slightly enlarged rounded head from which is continued laterally a second rounded neck, a disk shaped button extending from said last mentioned neck said button having bulging faces, a forwardly curved upwardly extending pointed ear extending from said head in alinement with said button.

In testimony whereof I affix my signature, in the presence of two witnesses.

LOYD D. GREENLAND.

Witnesses:
J. WRIGHT WILLIAMS,
JOHN STEPHENS.

Copies of this patent may be obtained for five cents each, by addressing the "Commissioner of Patents, Washington, D. C."